United States Patent
Sakai et al.

(10) Patent No.: US 11,935,401 B2
(45) Date of Patent: *Mar. 19, 2024

(54) VEHICLE CONTROL DEVICE, VEHICLE CONTROL METHOD, AND VEHICLE CONTROL SYSTEM

(71) Applicant: TOYOTA JIDOSHA KABUSHIKI KAISHA, Toyota (JP)

(72) Inventors: Katsuhiro Sakai, Hadano (JP); Makoto Kawaharada, Shizuoka-ken (JP); Akihide Tachibana, Susono (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/079,446

(22) Filed: Dec. 12, 2022

(65) Prior Publication Data
US 2023/0109606 A1    Apr. 6, 2023

Related U.S. Application Data

(63) Continuation of application No. 16/681,077, filed on Nov. 12, 2019, now Pat. No. 11,568,740.

(30) Foreign Application Priority Data

Dec. 25, 2018   (JP) ................................ 2018-241676

(51) Int. Cl.
*G08G 1/01* (2006.01)
*B60W 40/04* (2006.01)
(Continued)

(52) U.S. Cl.
CPC ........... *G08G 1/0133* (2013.01); *B60W 40/04* (2013.01); *G05D 1/0214* (2013.01); *B60W 2556/50* (2020.02)

(58) Field of Classification Search
CPC ...... G08G 1/0133; G08G 1/166; G08G 1/164; G08G 1/165; B60W 40/04;
(Continued)

(56) References Cited

U.S. PATENT DOCUMENTS 9,547,307 B1    1/2017  Cullinane et al.
11,568,740 B2 *  1/2023  Sakai ..................... G08G 1/164
(Continued)

OTHER PUBLICATIONS

U.S. Appl. No. 16/681,077, filed Nov. 12, 2019, Katsuhiro Sakai et al.

*Primary Examiner* — Aniss Chad
*Assistant Examiner* — Chase L Cooley
(74) *Attorney, Agent, or Firm* — Dinsmore & Shohl LLP (57) ABSTRACT

A vehicle control device includes a communication unit configured to communicate with a plurality of autonomous driving vehicles configured to perform autonomous traveling, and a processor. The processor is configured to, when an abnormality occurs in or around at least one first autonomous driving vehicle among the plurality of autonomous driving vehicles, determine a travel instruction for controlling traveling of the first autonomous driving vehicle, transmit the travel instruction to the first autonomous driving vehicle via the communication unit, set a priority representing the degree of the priority in which an instruction operator is notified of the travel instruction in the order determined according to the content of the abnormality, notify any one of at least one instruction terminal of the determined travel instruction in the order of highest priority, and receive a result of checking the determined travel instruction from the instruction terminal.

14 Claims, 7 Drawing Sheets

(51) Int. Cl.
*G05D 1/00* (2006.01)
*G05D 1/02* (2020.01)

(58) Field of Classification Search
CPC ......... B60W 2556/50; B60W 50/0098; B60W 2050/0005; B60W 2050/0075; B60W 2556/65; G05D 1/0214; G05D 1/0027; G05D 2201/0213; G05D 1/0055; G05D 1/0088
See application file for complete search history.

(56) References Cited

U.S. PATENT DOCUMENTS

| | | | |
|---|---|---|---|
| 2012/0323479 A1* | 12/2012 | Nagata | G08G 1/166 701/301 |
| 2017/0090480 A1 | 3/2017 | Ho et al. | |
| 2018/0356814 A1 | 12/2018 | Brooks | |
| 2018/0364700 A1 | 12/2018 | Liu et al. | |
| 2021/0001887 A1 | 1/2021 | Wang et al. | |

* cited by examiner

| CONTENT OF ABNORMALITY | CONTENT OF TRAVEL INSTRUCTION | RISK DEGREE | ALLOWABLE TIME | PRIORITY |
|---|---|---|---|---|
| OCCURRENCE OF ACCIDENT | PULL OVER ONTO ROAD SHOULDER AND STOP | 10 | 60 | 8 |
| ... | ... | ... | ... | ... |
| SIGNAL STATE INFORMATION CANNOT BE ACQUIRED | STOP IN FRONT OF INTERSECTION | 8 | 60 | 6.4 |
| DEADLOCK | ... | 7 | ... | ... |
| PART FAILURE | ... | 6 | ... | ... |
| BREAKING OF EXTERNAL DEVICE | ... | 5 | ... | ... |
| DECREASE IN ACCURACY OF ESTIMATING POSITION OF SUBJECT VEHICLE | ... | 4 | ... | ... |
| VEHICLE CANNOT BE STARTED | ... | 3 | ... | ... |
| MISBEHAVIOR OF USER | PULL OVER ONTO ROAD SHOULDER AND STOP | 2 | 300 | 0 |
| TRAVEL CONTROL IS ROUGH | DECELERATE | 1 | 300 | 0 |

600

VEHICLE CONTROL DEVICE, VEHICLE CONTROL METHOD, AND VEHICLE CONTROL SYSTEM

CROSS-REFERENCE TO RELATED APPLICATION

This application is a continuation of U.S. patent application Ser. No. 16/681,077 filed Nov. 12, 2019, which claims priority to Japanese Patent Application No. 2018-241676 filed on Dec. 25, 2018, the disclosures of which are incorporated herein by reference in their entireties.

BACKGROUND

1. Technical Field

The present disclosure relates to a vehicle control device, a vehicle control method, and a vehicle control system that control an autonomous driving vehicle.

2. Description of Related Art

Research has been conducted on a technology for controlling an autonomous driving vehicle that can autonomously travel without requiring a driver, by linking the autonomous driving vehicle to a server which is communicably connected thereto via a communication network. For example, a technology has been proposed in which a server causes an autonomous driving vehicle to head to a pickup location that is designated by dispatching information, by transmitting the dispatching information to the autonomous driving vehicle via a communication network, or in which the server tracks the autonomous driving vehicle by receiving the current position of the autonomous driving vehicle transmitted from the autonomous driving vehicle via the communication network (see, for example, U.S. Pat. No. 9,547,307).

SUMMARY

While an autonomous driving vehicle is traveling, an abnormality, such as the occurrence of an accident ahead of the autonomous driving vehicle or deterioration of the condition of a user aboard the autonomous driving vehicle, may occur. As such, when an abnormality occurs around the autonomous driving vehicle or in the autonomous driving vehicle itself, there is a possibility that the autonomous driving vehicle cannot take appropriate action.

The present disclosure provides a vehicle control device, a vehicle control method, and a vehicle control system that can appropriately control an autonomous driving vehicle even when any abnormality occurs around the autonomous driving vehicle or in the autonomous driving vehicle itself.

According to a first aspect of the present disclosure, a vehicle control device is provided. The vehicle control device includes a communication unit configured to communicate with a plurality of autonomous driving vehicles configured to perform autonomous traveling, and a processor. The processor is configured to, when an abnormality occurs in or around at least one first autonomous driving vehicle among the plurality of autonomous driving vehicles, determine a travel instruction for controlling traveling of each of the at least one first autonomous driving vehicle, transmit the travel instruction to each of the at least one first autonomous driving vehicle via the communication unit, set a priority representing the degree of the priority in which an instruction operator is notified of the travel instruction in the order determined according to the content of the abnormality, for each of the at least one first autonomous driving vehicle, notify any one of at least one instruction terminal of the determined travel instruction to the first autonomous driving vehicle, among the at least one first autonomous driving vehicle, in the order of highest priority, and receive a result of checking the determined travel instruction from the at least one instruction terminal.

The processor may set, for each of the at least one first autonomous driving vehicle, the priority based on at least one of a risk degree representing the degree of risk that is determined according to the content of the abnormality of the first autonomous driving vehicle, and allowable time for checking the travel instruction to the first autonomous driving vehicle.

The processor may set the priority higher as the risk degree is higher or the allowable time is shorter.

The processor may calculate the priority by multiplying the risk degree by a value obtained by dividing the difference between the maximum value of a settable allowable time and the allowable time by the maximum value.

In addition, the communication unit may receive state information indicating a state of the first autonomous driving vehicle at the time when the abnormality occurs, for each of the at least one first autonomous driving vehicle. The processor may set the allowable time according to the state of the first autonomous driving vehicle indicated in the state information of each of the at least one first autonomous driving vehicle.

Furthermore, according to the content of the abnormality of each of the at least one first autonomous driving vehicle, the processor may determine whether to notify the travel instruction to any one of the at least one instruction terminal after or before transmitting the travel instruction to each of the at least one first autonomous driving vehicle.

When the content of the abnormality is a misbehavior of an occupant, the processor may notify the determined travel instruction to any one of the at least one instruction terminal, receive, before transmitting the determined travel instruction to the first autonomous driving vehicle, the result of checking the determined travel instruction from the at least one instruction terminal, and transmit, to the first autonomous driving vehicle, a travel instruction determined based on the checking result.

According to a second aspect of the present disclosure, a vehicle control method is provided. The vehicle control method includes; determining, when an abnormality occurs in or around at least one first autonomous driving vehicle among a plurality of autonomous driving vehicles that is configured to perform autonomous traveling, a travel instruction for controlling traveling of each of the at least one first autonomous driving vehicle, transmitting the travel instruction to each of the at least one first autonomous driving vehicle via a communication unit configured to communicate with the plurality of autonomous driving vehicles, setting a priority representing the degree of the priority in which an instruction operator is notified of the travel instruction in the order determined according to the content of the abnormality, for each of the at least one first autonomous driving vehicle, notifying any one of at least one instruction terminal of the determined travel instruction to the first autonomous driving vehicle, among the at least one first autonomous driving vehicle, in the order of highest priority, and receiving a result of checking the determined travel instruction from the at least one instruction terminal.

According to a third aspect of the present disclosure, a vehicle control system is provided. The vehicle control system includes at least one first autonomous driving vehicle among a plurality of autonomous driving vehicles that is configured to perform autonomous traveling, and a vehicle control device configured to communicate with the plurality of autonomous driving vehicles via a communication network. The vehicle control device includes a processor. The processor is configured to determine, when an abnormality occurs in or around the at least one first autonomous driving vehicle among the plurality of autonomous driving vehicles, a travel instruction for controlling traveling of each of the at least one first autonomous driving vehicle, transmit the travel instruction to each of the at least one first autonomous driving vehicle via the communication unit, set a priority representing the degree of the priority in which an instruction operator is notified of the travel instruction in the order determined according to the content of the abnormality, for each of the at least one first autonomous driving vehicle, notify any one of at least one instruction terminal of the determined travel instruction to the first autonomous driving vehicle, among the at least one first autonomous driving vehicle, in the order of highest priority, and receive a result of checking the determined travel instruction from the at least one instruction terminal.

With each aspect of the present disclosure, it is possible to appropriately control the autonomous driving vehicle even when any abnormality occurs around the autonomous driving vehicle or in the autonomous driving vehicle itself.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION

Hereinafter, a vehicle control device, and a vehicle control system including the vehicle control device will be described with reference to the drawings. The vehicle control device is configured to communicate with a plurality of autonomous driving vehicles that is configured to perform autonomous traveling via a communication network. When an abnormality occurs around one or more autonomous driving vehicles among the plurality of the autonomous driving vehicles or in the autonomous driving vehicles themselves, the vehicle control device remotely controls the autonomous driving vehicles associated with the abnormality. For the above, the vehicle control device controls the autonomous driving vehicles by preparing an instruction on traveling control (hereinafter, simply referred to as a "travel instruction") of the autonomous driving vehicles, corresponding to action the autonomous driving vehicles should take with respect to the abnormality, and by transmitting the prepared travel instruction to the autonomous driving vehicles associated with the abnormality via the communication network. In addition, the vehicle control device sets a priority representing the degree of the priority for notifying the travel instruction to an instruction operator that remotely checks or determines the content of the travel instruction to the autonomous driving vehicles. The priority is determined, according to a risk degree representing the magnitude of the influence the occurring abnormality has on the safety, and the allowable time for checking the travel instruction with respect to the abnormality. Then, the vehicle control device notifies an instruction terminal, operated by the instruction operator, of the content of the travel instruction transmitted to the autonomous driving vehicles, together with information indicating the state of the autonomous driving vehicles (hereinafter, referred to as "vehicle state information") and the like, in the order from the autonomous driving vehicle associated with an abnormality with the higher priority. The vehicle state information includes, for example, the vehicle speed, whether any part of the vehicle is broken, and whether the air-bag works. When the instruction operator checks the content of the travel instruction, and determines that it is better to modify the content of the travel instruction or it is better to transmit an additional travel instruction, the vehicle control device prepares a modified or added travel instruction in response to an operation of the instruction operator, and transmits the modified or added travel instruction to the autonomous driving vehicles via the communication network. As such, the vehicle control device can appropriately control the autonomous driving vehicles even when any abnormality occurs around the autonomous driving vehicles or in the autonomous driving vehicles themselves.

In addition, examples of the travel instruction include an instruction to designate a lane (for example, a travel lane, a passing lane, or a climbing lane) on which the autonomous driving vehicle should travel, an instruction to designate the upper or lower limit of the vehicle speed, an instruction to maintain the current vehicle speed, an instruction to decelerate by a designated speed, an instruction to stop the autonomous driving vehicle, an instruction to start the stopped autonomous driving vehicle, an instruction to maintain an inter-vehicle distance with a vehicle traveling ahead, and an instruction to perform manual driving by a user on board (hereinafter, sometimes referred to as an "occupant"). In addition, the instruction to stop the autonomous driving vehicle may include various kinds of instructions, such as an instruction to stop immediately, an instruction to stop after pulling over onto the road shoulder, and an instruction to stop after traveling a designated distance. Furthermore, the travel instruction may include an instruction to travel according to the travel instruction already notified to the autonomous driving vehicle, and an instruction to cause the autonomous driving vehicle to travel completely autonomously. Moreover, the travel instruction may include information indicating a validity term of the travel instruction, for example, a period during which the travel instruction is valid after the vehicle receives the travel instruction (hereinafter, referred to as a "validity period"), or a section in which the travel instruction is valid (hereinafter, referred to as a "validity section"). In addition, when the validity term or validity section of the travel instruction is not indicated, the travel instruction may be regarded as being valid until the next travel instruction is received.

Figure 1:
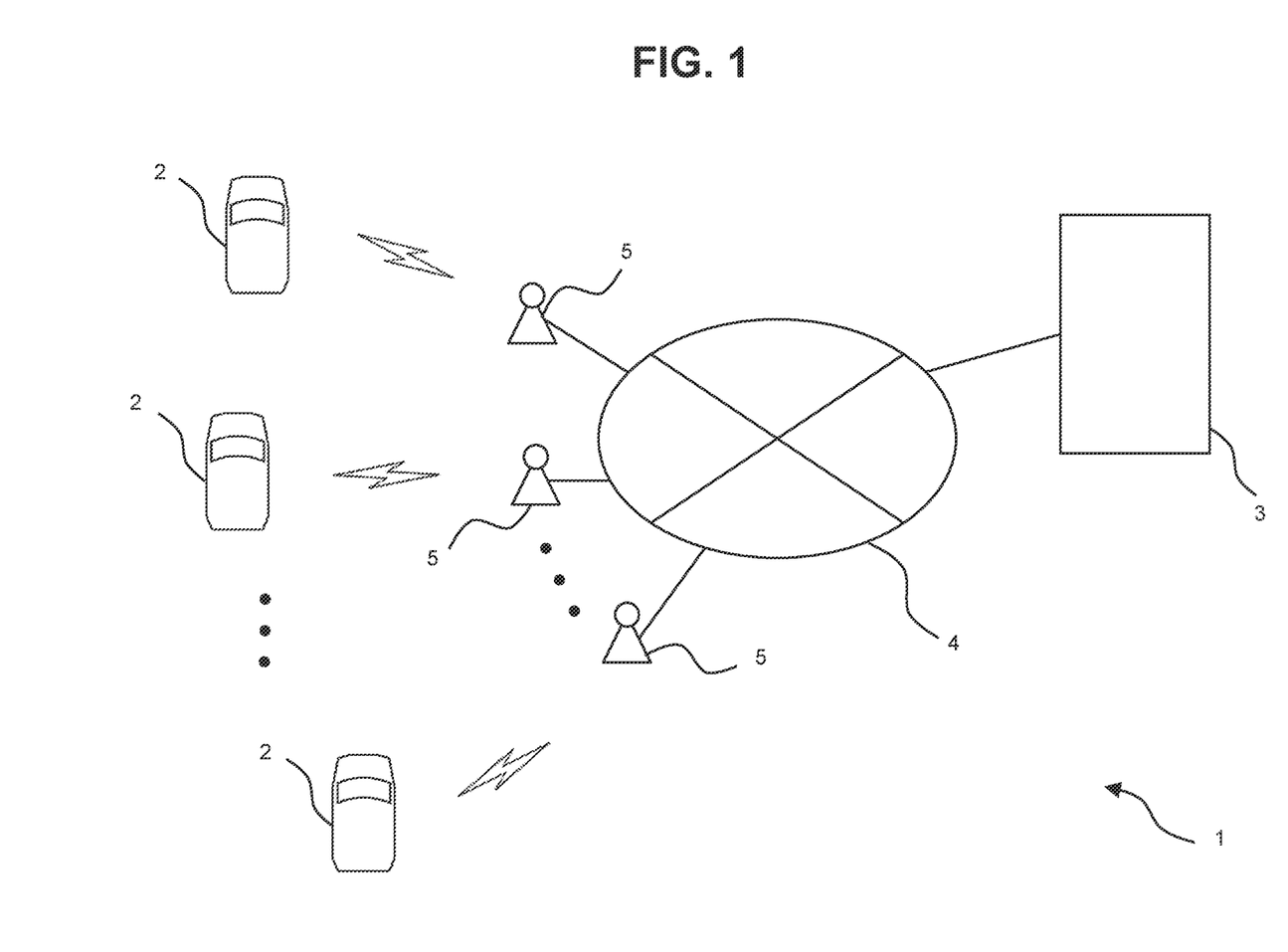
FIG. 1 is a schematic configuration diagram of a vehicle control system provided with a vehicle control device according to one embodiment.

FIG. 1 is a schematic configuration diagram of the vehicle control system provided with the vehicle control device according to one embodiment. The vehicle control system 1 includes a plurality of vehicles 2 that is an example of the autonomous driving vehicle that can perform autonomous traveling, and a server 3 that is an example of the vehicle control device. Each of the vehicles 2 can communicate with the server 3 via the communication network 4 consisting of an optical communication line and the like, and a wireless base station 5 connected to the communication network 4 via a gateway (not shown). In other words, the wireless base station 5 relays communication between each vehicle 2 and the server 3. In the present embodiment, since each vehicle 2 has the same configuration on vehicle control processing, and the server 3 applies the same vehicle control processing to each vehicle 2, one vehicle 2 will be described below unless specifically needed.

The vehicle 2 may be, for example, a vehicle used for a taxi service or a ride share service, or a vehicle usable only by a specific user. Alternatively, the vehicle 2 may be used for transporting luggage. The vehicle 2 autonomously travels along a travel route to a travel destination, such as a location at which a user on board exits from the vehicle 2 or a location at which the user scheduled to board the vehicle boards the vehicle 2. The travel route may be set in the vehicle 2 by a navigation system of the vehicle 2, or transmitted to the vehicle 2 from the server 3 via the communication network 4 and the wireless base station 5. In addition, the vehicle 2 travels according to the travel instruction received from the server 3 via the communication network 4 and the wireless base station 5. Furthermore, when the travel route is set by the navigation system of the vehicle 2, the vehicle 2 may transmit the travel route to the server 3 via the wireless base station 5 and the communication network 4 at the time when, for example, the travel route is set or the vehicle 2 starts traveling according to the set travel route.

The server 3 tracks the vehicle 2 based on a position of the vehicle 2, received therefrom. Then, for example, when the vehicle 2 notifies the server 3 that an abnormality has occurred, the server 3 prepares a travel instruction corresponding to the abnormality that has occurred, and transmits the prepared travel instruction to the vehicle 2 via the communication network 4 and the wireless base station 5.

In addition, the server 3 may be communicable with another server (not shown) that provides traffic information indicating a traffic status via the communication network 4. Then, the server 3 may acquire the travel route of the vehicle 2 and the traffic information around the vehicle 2 from another server that provides the traffic information, via the communication network 4. Thereafter, with reference to the traffic information at the current position of the vehicle 2 and the vehicle state information received from the vehicle 2, the server 3 detects a candidate of the abnormality that may have occurred in the vehicle 2 itself or around the vehicle 2, and causes a monitoring operator to check whether an abnormality has actually occurred with respect to the abnormality candidate. In this case, the server 3 also prepares the travel instruction corresponding to the abnormality that has occurred, and transmits the prepared travel instruction to the vehicle 2 via the communication network 4 and the wireless base station 5.

Figure 2:
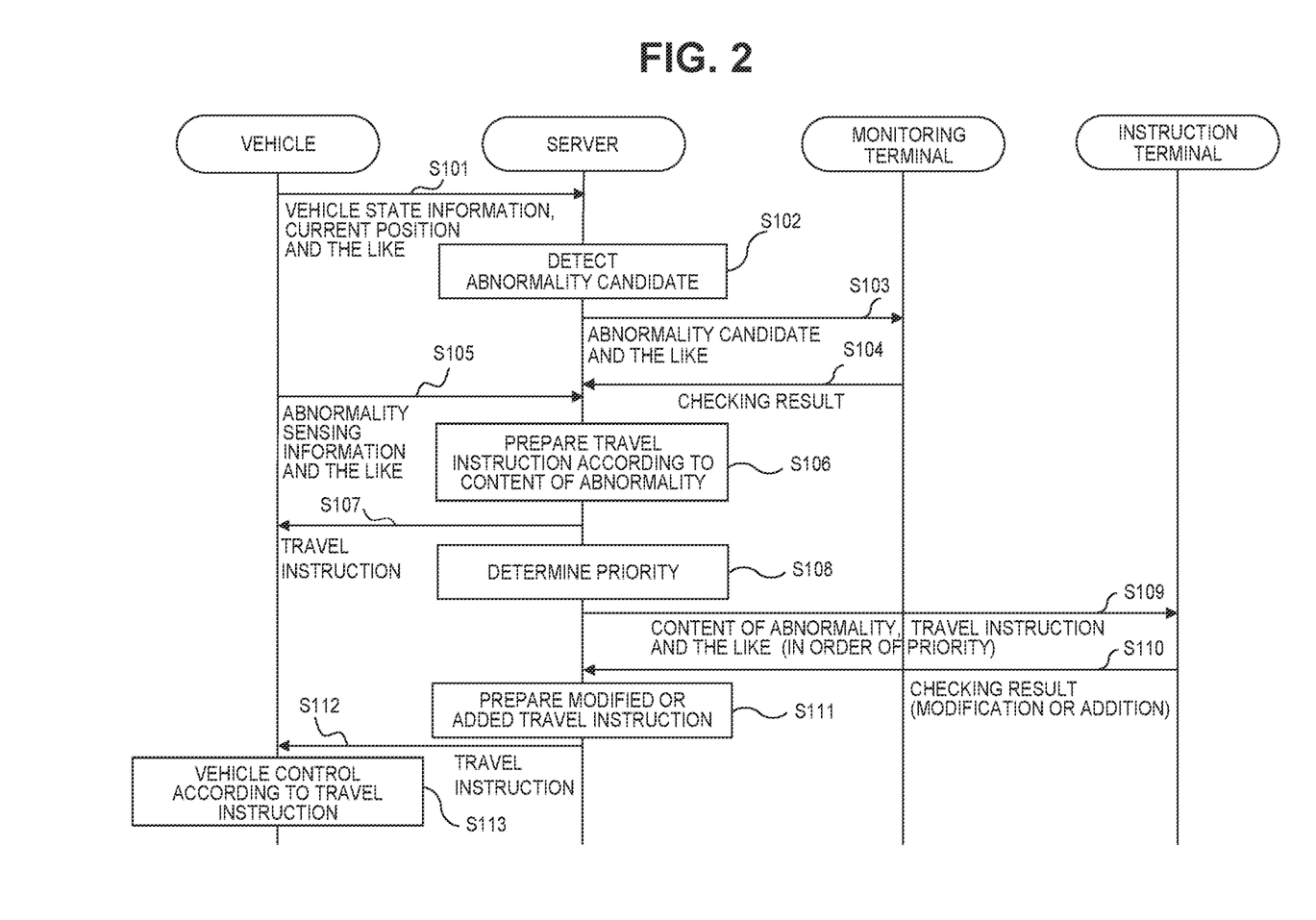
FIG. 2 is a sequence diagram of vehicle control processing.

FIG. 2 is a sequence diagram of the vehicle control processing. For example, at predetermined intervals, the vehicle 2 transmits the current position of the vehicle 2, an outside-vehicle image around the vehicle 2, captured by an in-vehicle camera, the vehicle state information, and the like, to the server 3 via the wireless base station 5 and the communication network 4 (step S101). The server 3 detects an abnormality candidate in the vehicle 2 itself or around the vehicle 2 based on the received vehicle state information, outside-vehicle image, and traffic information at the current position of the vehicle 2 (step S102). Then, the server 3 transmits, to a monitoring terminal, the detected abnormality candidate, the vehicle state information, and the like (step S103). Thereafter, a signal representing a result of checking the abnormality candidate by the monitoring operator is transmitted, as a response, to the server 3 from the monitoring terminal (step S104).

On the other hand, when an abnormality that has occurred in the vehicle 2 itself or around the vehicle 2 is sensed by an electronic control unit (ECU) of the vehicle 2 or the occupant of the vehicle 2, the vehicle 2 notifies the server 3 of abnormality sensing information indicating the content of the sensed abnormality via the wireless base station 5 and the communication network 4 (step S105). The server 3 prepares the travel instruction according to the content of the abnormality notified by the vehicle 2, or the content of the abnormality detected by the server 3 and checked by the monitoring operator (step S106). Then, the server 3 transmits the prepared travel instruction to the vehicle 2 via the communication network 4 and the wireless base station 5 (step S107).

Moreover, the server 3 determines the priority according to the content of the abnormality (step S108). Then, the server 3 notifies the instruction terminal of the content of the notified or sensed abnormality, and the content of the transmitted travel instruction (step S109). Here, when the abnormality is notified or sensed in associated with a plurality of vehicles 2, the server 3 notifies the content of the travel instruction and the like to the instruction terminal in the order from the vehicle 2 with the highest priority. Then, a signal representing a result of checking the travel instruction by the instruction operator, transmitted to the vehicle 2, is transmitted, as a response, to the server 3 (step S110). In addition, the signal representing the checking result represents, for example, confirmation of the transmitted travel instruction, or modification or addition of the travel instruction.

When the signal representing the checking result transmitted from the instruction terminal represents modification or addition of the travel instruction, the server 3 prepares the modified or added travel instruction (step S111). Then, the server 3 transmits the modified or added travel instruction to the vehicle 2 via the communication network 4 and the wireless base station 5 (step S112).

The ECU of the vehicle 2 controls traveling of the subject vehicle according to the travel instruction received from the server 3 (step S113). Upon receiving the travel instruction, the ECU of the vehicle 2 immediately controls traveling of the subject vehicle according to the travel instruction. Therefore, even when the vehicle 2 first receives the travel instruction and then additionally receives a modified travel instruction, the ECU starts control of traveling of the subject vehicle according to the travel instruction first received. Then, when receiving modified travel instruction, the ECU controls traveling of the subject vehicle according to the modified travel instruction.

Figure 3:
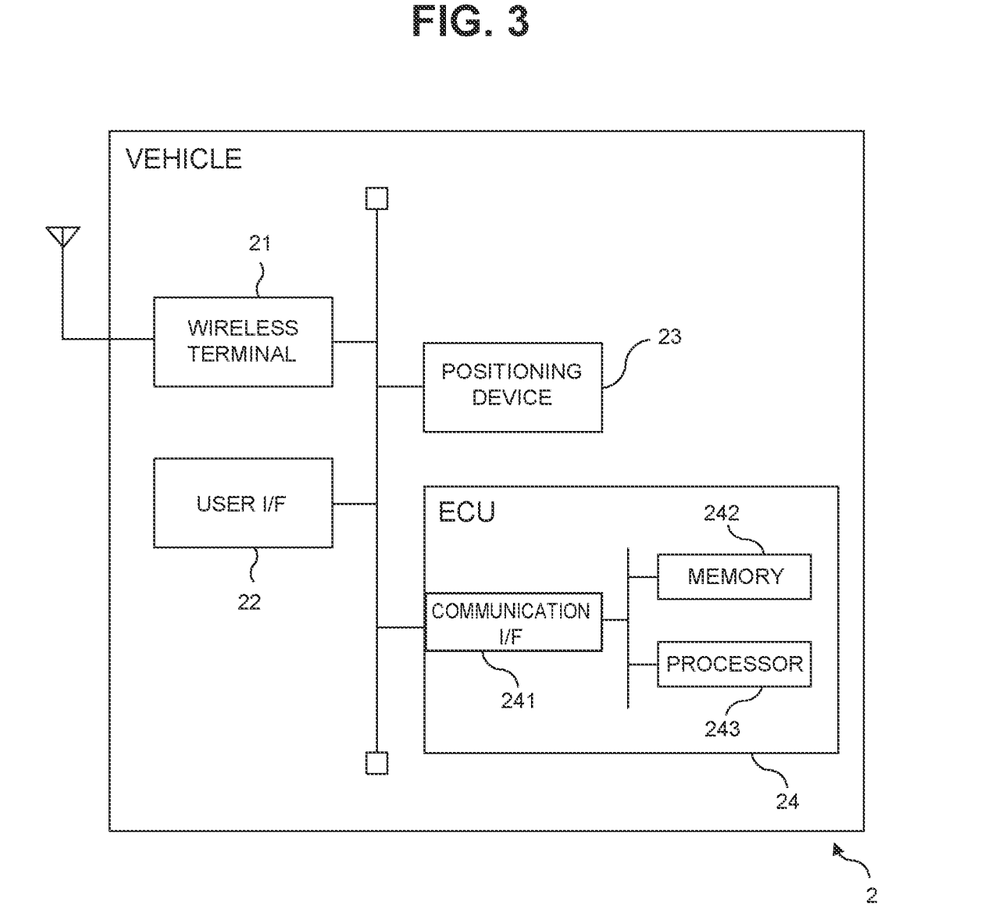
FIG. 3 is a schematic configuration diagram of a control system on traveling of a vehicle.

FIG. 3 is a schematic configuration diagram of a control system on traveling of the vehicle 2. The vehicle 2 includes a wireless terminal 21, a user interface 22, a positioning device 23, and an ECU 24. The wireless terminal 21, the user interface 22, and the positioning device 23 are communicably connected to the ECU 24 via, for example, an in-vehicle network, provided in the vehicle 2 and in conformity with a standard, such as a controller area network (CAN). Further, the vehicle 2 may include an outside vehicle camera (not shown) for capturing an image of the area around the vehicle 2 and generating an outside-vehicle image showing the area around the vehicle 2, an inside vehicle camera (not shown) for capturing an image inside the cabin of the vehicle 2 and generating an inside-vehicle image showing the inside of the cabin of the vehicle 2, an outside vehicle sensor (not shown), such as a radar or an LIDER sensor, for acquiring information on the surroundings of the vehicle 2, and a communication device (not shown) for receiving a radio signal that represents the lighting state of a traffic signal and that is transmitted from a roadside unit. Furthermore, the vehicle 2 may include a storage device (not shown) for storing map information, and the navigation system (not shown) for obtaining a travel route, from the current position of the vehicle 2 to a travel destination, according to a predetermined route search method, such as Dijkstra's algorithm. Furthermore, the vehicle 2 further includes various sensors (not shown), such as a speed sensor for measuring the speed of the vehicle 2 and an acceleration sensor for measuring the acceleration of the vehicle 2, for acquiring information indicating the state of the vehicle 2.

The wireless terminal 21 is an example of a communication unit, and includes, for example, an antenna, and a signal processing circuit for performing various processes on wireless communication, such as modulation and demodulation of a wireless signal. The wireless terminal 21 receives a downlink wireless signal from the wireless base station 5, and transmits an uplink wireless signal to the wireless base station 5. In other words, the wireless terminal 21 extracts, from the downlink wireless signal received from the wireless base station 5, a signal (for example, a travel instruction) transmitted from the server 3 to the vehicle 2, and passes the signal to the ECU 24. In addition, the wireless terminal 21 generates an uplink wireless signal including a signal (for example, the current position of the vehicle 2, the outside-vehicle image, the vehicle state information, and abnormality sensing information), transmitted from the ECU 24 to the server 3, and transmits the wireless signal.

The user interface 22 is an example of a user interface unit, and displays various pieces of information (for example, a map and a travel route around the current position of the vehicle 2, a distance to a scheduled exit location, or the estimated arrival time to the scheduled exit location) for the user aboard the vehicle 2. Furthermore, the user interface 22 generates an operation signal in response to an operation by the user aboard the vehicle 2, for example, an operation indicating the content of the abnormality sensed by the user, and outputs the operation signal to the ECU 24. For the above, the user interface 22 is provided in the cabin of the vehicle 2 and includes, for example, a display device, such as a liquid crystal display, and an input device having one or more operation buttons. Alternatively, the user interface 22 may be a device, such as a touch panel display in which the display device and the input device are integrated.

The positioning device 23 is an example of a positioning unit, and measures the position of the vehicle 2 at predetermined intervals. For the above, the positioning device 23 may include, for example, a receiving device for receiving a global positioning system (GPS) signal, and an operation circuit for calculating the position of the vehicle 2 from the GPS signal. Moreover, the positioning device 23 may be integrated into the navigation system. Then, every time the positioning device 23 measures the position of the vehicle 2, the positioning device 23 outputs the measured value to the ECU 24.

The ECU 24 is an example of a traveling control unit, and controls autonomous-driving of the vehicle 2 and each part of the vehicle 2. For the above, the ECU 24 includes, for example, a communication interface 241 for communicating with each part of the vehicle 2, a memory 242, and a processor 243.

The communication interface 241 has an interface circuit for connecting the ECU 24 to the in-vehicle network. In other words, the communication interface 241 is connected to the wireless terminal 21, the user interface 22, and the positioning device 23 via the in-vehicle network. Then, the communication interface 241 passes a signal received from the server 3, such as a travel instruction taken from the wireless terminal 21, to the processor 243. Similarly, the communication interface 241 passes, to the processor 243, the operation signal received from the user interface 22, the measured value of the current position of the vehicle 2 received from the positioning device 23, the outside-vehicle image received from the outside vehicle camera, or the like. In addition, the communication interface 241 outputs, to the wireless terminal 21, a signal to be transmitted to the server 3, such as the abnormality sensing information, the current position of the vehicle 2, or the vehicle state information, which are received from the processor 243. Further, the communication interface 241 outputs, to the user interface 22, a signal including information to be displayed on the user interface 22, received from the processor 243.

The memory 242 is an example of a storage unit, and includes, for example, a volatile semiconductor memory and a non-volatile semiconductor memory. The memory 242 stores data, used in various processes performed by the processor 243 of the ECU 24. Examples of the data stored in the memory 242 include the current position of the vehicle 2, the travel route, the user's scheduled boarding location and scheduled exit location included in a dispatch instruction, and a travel instruction. Furthermore, the memory 242 may store the outside-vehicle image, an inside-vehicle image, map information, or the like.

The processor 243 includes one or more central processing units (CPUs) and peripheral circuits thereof. The processor 243 may further include other operation circuits, such as a logical operation unit, a numerical operation unit, and a graphics processing unit. When the user boards the vehicle 2, the processor 243 notifies the navigation system of the position of the vehicle 2, measured by the positioning device 23, at the time when the user boards the vehicle 2, and the scheduled exit location of the user. Then the processor 243 causes the navigation system to search for the travel route from the position of the vehicle at the time when the user boards the vehicle 2 to the scheduled exit location of the user. In addition, as described above, the processor 243 may receive the travel route from the server 3 via the communication network 4, and the like.

The processor 243 controls autonomous-driving of the vehicle 2 such that the vehicle 2 travels along the found travel route. Here, the processor 243 controls autonomous-driving of the vehicle 2 according to the travel instruction in the validity term or the validity section of the travel instruction received from the server 3. For example, when the travel instruction designates a lane on which the vehicle 2 travels, the processor 243 controls the steering wheel of the vehicle 2 such that the vehicle 2 travels on the designated lane by performing a lane detecting process on the outside-vehicle image and detecting the designated lane shown on the outside-vehicle image. In addition, when the travel instruction designates the upper limit of the vehicle speed, the processor 243 controls the power-train and brake mechanism of the vehicle 2 such that the speed of the vehicle 2 is maintained at or below the upper limit. Further, when the travel instruction is an instruction to stop the vehicle 2, the processor 243 controls the steering wheel, power-train and brake mechanism of the vehicle 2 such that the vehicle 2 is stopped at a place (for example, a road shoulder) designated by the travel instruction. Furthermore, when the travel instruction is an instruction to perform manual driving by the user aboard the vehicle 2, the processor 243 controls the traveling of the vehicle 2 in response to the user's operation of the steering wheel, the accelerator, the brake pedal, and the like.

In addition, the processor 243 transmits, to the server 3, the measured value of the current position of the vehicle 2 acquired by the positioning device 23, the outside-vehicle image, the vehicle state information, and the like, together with the identification information of the vehicle 2 at predetermined intervals (for example, every 30 seconds, 1 minute, or 5 minutes) via the wireless terminal 21. Further, the processor 243 may transmit, to the server 3, the travel route obtained by the navigation system together with the identification information of the vehicle 2 via the wireless terminal 21.

Furthermore, when the processor 243 senses an abnormality in the vehicle 2 itself or around the vehicle 2, the processor 243 transmits, to the server 3, abnormality sensing information including the identification information of the vehicle 2, together with a flag representing the content of the sensed abnormality via the wireless terminal 21. Here, the processor 243 may transmit, to the server 3, the vehicle state information, the outside-vehicle image, or the inside-vehicle image at the time when the abnormality has been sensed, together with the abnormality sensing information. For example, when a value of the acceleration measured by the acceleration sensor provided in the vehicle 2 is equal to or higher than a predetermined threshold, the processor 243 determines that an accident has occurred. Then, the processor 243 includes, in the abnormality sensing information, a flag representing that the accident has occurred.

Moreover, in case the processor 243 cannot receive a wireless signal that includes signal state information indicating the lighting state of the traffic signal from the roadside unit even when the vehicle 2 approaches an intersection where the traffic signal is installed such that the vehicle 2 is within a predetermined distance from the intersection, the processor 243 includes, in the abnormality sensing information, a flag representing that the signal state information cannot be acquired. In addition, for example, when the processor 243 tries to turn the vehicle 2 right or left along the travel route, and a measured value of the distance from the vehicle 2 to an object around the vehicle 2 by the outside vehicle sensor is constant, or another vehicle around the vehicle 2, which is sensed from the outside-vehicle image, does not move for a certain period of time, and thus the vehicle 2 itself cannot move as a result, the processor 243 determines that a deadlock has occurred. Then, the processor 243 includes, in the abnormality sensing information, a flag representing that the deadlock has occurred.

Furthermore, when the processor 243 receives a signal representing that some part of the vehicle 2 does not operate normally, from any of a plurality of sensors, provided in the vehicle 2, for sensing whether each part of the vehicle 2 is operating normally, it determines that the part has failed.

Then, the processor 243 includes, in the abnormality sensing information, a flag representing a part failure.

Moreover, when the processor 243 is notified by the positioning device 23 that a positioning signal cannot be received, the processor 243 determines that accuracy of estimating the position of the vehicle 2 has decreased. Then, the processor 243 includes, in the abnormality sensing information, a flag representing that the accuracy of estimating the position of the subject vehicle has decreased.

In addition, when the processor 243 starts the vehicle 2, and a measured value of the distance from the vehicle 2 to an object around the vehicle 2 by the outside vehicle sensor is constant, or another vehicle around the vehicle 2, which is sensed from the outside-vehicle image, does not move for a certain period of time, and thus the vehicle 2 itself cannot move as a result, the processor 243 determines that the vehicle 2 cannot be started. Then, the processor 243 includes, in the abnormality sensing information, a flag representing that the vehicle 2 cannot be started.

Furthermore, for example, when the number of times the strength of a sound signal becomes equal to or higher than a predetermined threshold is equal to or higher than the predetermined number of times within a certain period, the processor 243 determines that the user has misbehaved. Here, the sound signal represents the sound collected by a microphone provided inside the vehicle 2. Alternatively, the processor 243 recognizes the sound made by the user by performing predetermined sound recognition processing on the sound signal, and when the number of predetermined keywords included in the recognized sound is equal to or greater than a predetermined number, the processor 243 may determine that the user has misbehaved. Alternatively, the processor 243 detects the posture of the user shown on the inside-vehicle image by inputting the inside-vehicle image into a classifier pre-trained to detect a posture of a person from an image, and when the detected posture of the user corresponds to a misbehavior, the processor 243 may determine that the user has misbehaved. Then, the processor 243 includes, in the abnormality sensing information, a flag representing that the user on board has misbehaved.

Furthermore, for example, when a sum of absolute values of the acceleration of the vehicle 2 acquired by the acceleration sensor at predetermined sampling intervals or a sum of absolute values of a change in a steering angle obtained at predetermined sampling intervals, during the latest certain period, is equal to or higher than a predetermined threshold, the processor 243 determines that traveling control of the vehicle 2 is rough. Then, the processor 243 includes, in the abnormality sensing information, a flag representing that the traveling control is rough.

Furthermore, when the processor 243 is notified by the user interface 22 that a user aboard the vehicle 2 has sensed an abnormality, the processor 243 includes, in the abnormality sensing information, a flag representing the content of the notified abnormality.

As described above, since a flag representing the content of an abnormality sensed by the ECU 24 or the user aboard the vehicle 2 is included in the abnormality sensing information, the server 3 or the instruction operator can determine an appropriate travel instruction to the vehicle 2.

Figure 4:
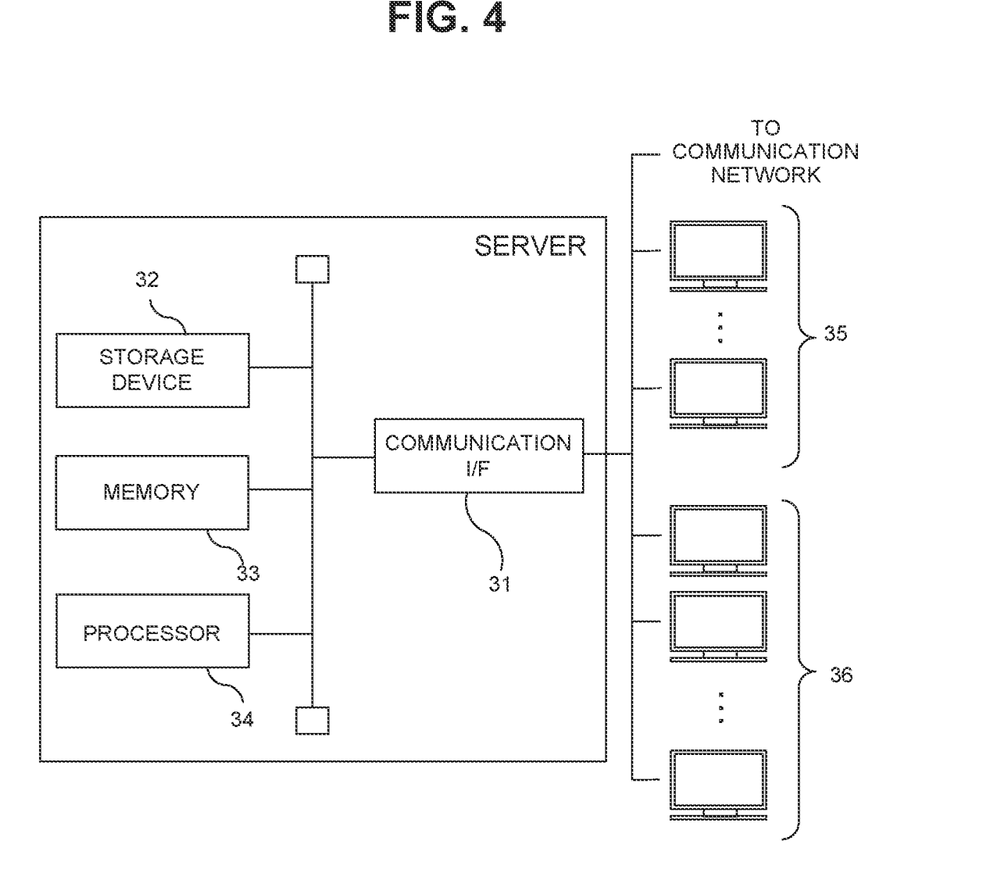
FIG. 4 is a schematic configuration diagram of a server that is one example of the vehicle control device.

FIG. 4 is a schematic configuration diagram of the server 3 that is an example of the vehicle control device. The server 3 includes a communication interface 31, a storage device 32, a memory 33, and a processor 34. The communication interface 31, the storage device 32, and the memory 33 are connected to the processor 34 via signal lines. Furthermore, the server 3 is connected to at least one monitoring terminal 35 and at least one instruction terminal 36 via the communication interface 31.

The communication interface 31 is an example of the communication unit, and includes an interface circuit for connecting the server 3 to the communication network 4, the monitoring terminal 35, and the instruction terminal 36, respectively. The communication interface 31 is configured to communicate with the wireless terminal 21 of the vehicle 2 via the communication network 4 and the wireless base station 5. In other words, the communication interface 31 passes, to the processor 34, an abnormality sensing signal, and the like, received from the wireless terminal 21 of the vehicle 2 via the wireless base station 5 and the communication network 4. Moreover, the communication interface 31 passes, to the processor 34, information indicating the traffic status, received from another server that informs the traffic status via the communication network 4. Further, the communication interface 31 transmits, to the vehicle 2 via the communication network 4 and the wireless base station 5, a travel instruction to the vehicle 2, and the like, received from the processor 34. Furthermore, the communication interface 31 transmits, to the monitoring terminal 35, the vehicle state information, the traffic information, and the like, received from the processor 34, receives, from the monitoring terminal 35, an operation signal representing that an abnormality has been sensed, and passes, to the processor 34, the received operation signal. Furthermore, the communication interface 31 transmits, to the instruction terminal 36, the information indicating the content of the abnormality, the travel instruction, the vehicle state information, and the like, received from the processor 34, receives, from the instruction terminal 36, an operation signal representing the result of checking the travel instruction, and passes, to the processor 34, the received operation signal.

The storage device 32 is an example of the storage unit, and includes, for example, a hard disk device or an optical recording medium, and an access device thereof. The storage device 32 stores various kinds of information used in the vehicle control processing, for example, information on each vehicle 2 (for example, identification information, a current position, and a travel route), a reference table showing a correspondence between the risk degree, allowable time, the content of travel instruction, and the like, and the content of the sensed abnormality, the map information, information indicating the traffic status, and the like. In addition, the storage device 32 may store a computer program for performing the vehicle control processing.

The memory 33 is another example of the storage unit, and includes, for example, a non-volatile semiconductor memory and a volatile semiconductor memory. The memory 33 stores various kinds of data, and the like, generated during the performance of the vehicle control processing.

The processor 34 is an example of a control unit, and includes one or more CPUs and peripheral circuits thereof. The processor 34 may further include other operation circuits, such as a logical operation unit and a numerical operation unit. Then, the processor 34 performs the vehicle control processing.

Each of the monitoring terminal 35 and the instruction terminal 36 includes, for example, an input device, such as a keyboard and a mouse, and a display device, such as a liquid crystal display. Alternatively, each of the monitoring terminal 35 and the instruction terminal 36 may include a device, such as a touch panel display, into which a display device and an input device are integrated. The monitoring terminal 35 is used, for example, for detecting an abnormality of each vehicle 2 by the monitoring operator. For the above, the monitoring terminal 35 displays the abnormality candidate, vehicle state information, current position, map information, traffic information, and the like, received from the processor 34. In addition, the monitoring terminal 35 generates an operation signal in response to an operation, by the monitoring operator, indicating that an abnormality has been sensed, and outputs the operation signal to the processor 34.

Moreover, the instruction terminal 36 is used, for example, for checking the travel instruction, determined by the server 3, to the vehicle 2 associated with a sensed abnormality by the instruction operator, and in some cases, for modifying the travel instruction or giving an additional travel instruction. For the above, the instruction terminal 36 displays, for example, the content of the sensed abnormality associated with a vehicle, the outside-vehicle image, the vehicle state information, the content of the travel instruction transmitted to the vehicle, the allowable time, and the like, received from the processor 34. Further, the instruction terminal 36 generates an operation signal in response to an operation, such as confirmation or modification of the transmitted travel instruction, by the instruction operator, and outputs the operation signal to the processor 34.

Figure 5:
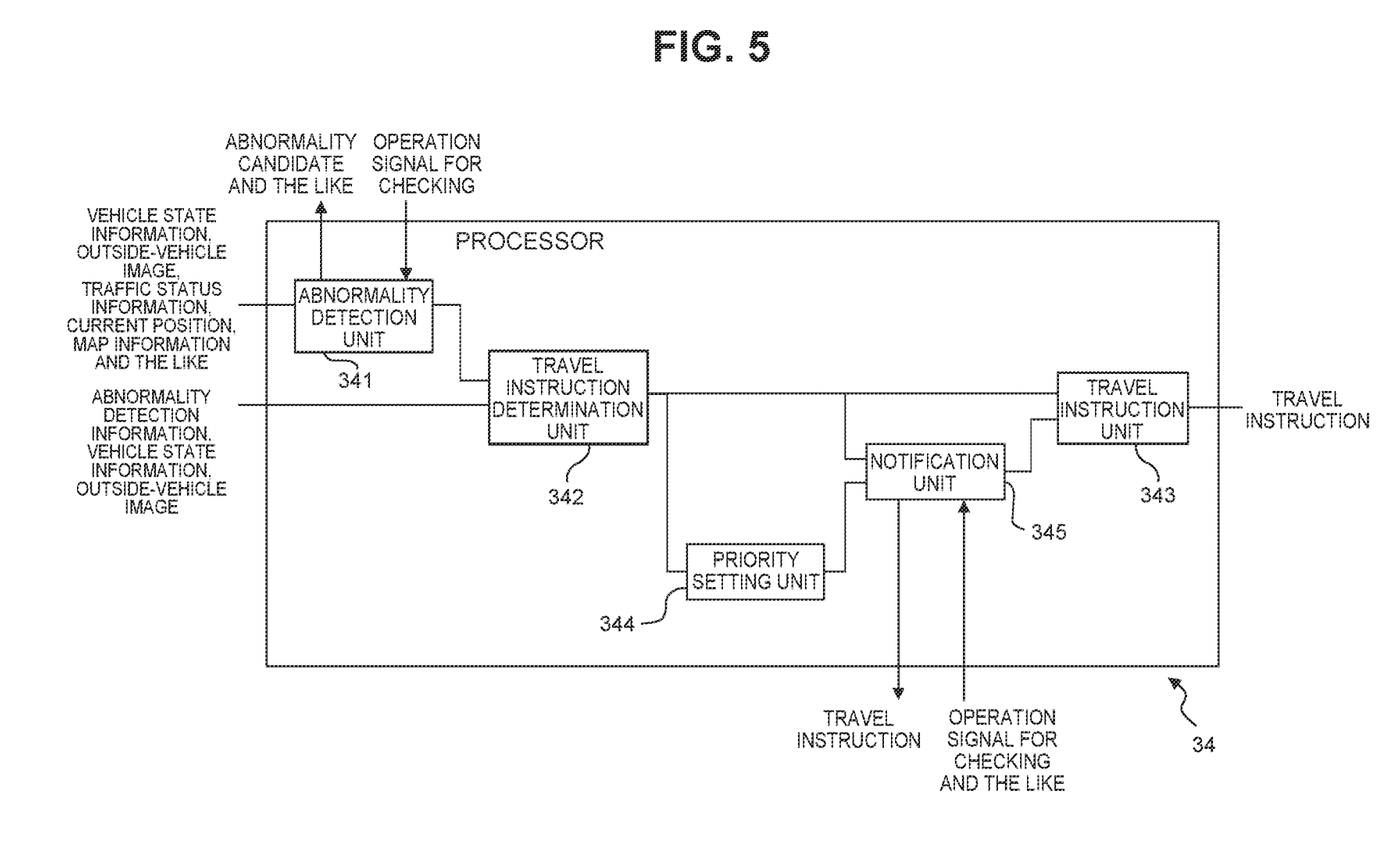
FIG. 5 is a functional block diagram of a processor of a server on the vehicle control processing.

FIG. 5 is a functional block diagram of the processor 34 on the vehicle control processing. The processor 34 includes an abnormality detection unit 341, a travel instruction determination unit 342, a travel instruction unit 343, a priority setting unit 344, and a notification unit 345. Each of these units included in the processor 34 is, for example, a functional module implemented by a computer program operating on the processor 34. Alternatively, each of these units included in the processor 34 may be dedicated operation circuits provided in the processor 34.

For each vehicle 2, at predetermined intervals or whenever receiving information, such as the current position of the vehicle 2, the abnormality detection unit 341 detects the candidate of an abnormality that may have occurred around the vehicle 2 or in the vehicle 2 itself, based on at least one of the current position of the vehicle 2, outside-vehicle image, inside-vehicle image, and vehicle state information that are received from the vehicle 2, and the information indicating the traffic status and map information that are received from another server. For the above, for example, the abnormality detection unit 341 inputs the outside-vehicle image or the inside-vehicle image into the classifier pretrained to sense a possible cause of an abnormality at the outside-vehicle image or the inside-vehicle image, and determines whether the possible cause of an abnormality is shown on the outside-vehicle image or the inside-vehicle image input into the classifier. Examples of a possible cause of an abnormality may include fire, a red light, people around the vehicle 2, animals, or foreign objects on the road (for example, cardboard boxes or fallen trees). The classifier may be, for example, a convolutional neural network or a support vector machine. Furthermore, the abnormality detection unit 341 detects an abnormality candidate that may have occurred around the vehicle 2 or in the vehicle 2 itself by referring to, for example, a reference table showing a correspondence between the content of assumed abnormalities and a combination of the types of possible causes of an abnormality, sensed at the outside-vehicle image or the inside-vehicle image, the state of the vehicle 2, such as the speed of the vehicle 2, indicated in the vehicle state information, the traffic information at the current position of the vehicle 2, a road structure (for example, an intersection and a highway) shown on the map information, and the like. In addition, such a reference table is stored, for example, in the storage device 32 in advance. Alternatively, the abnormality detection unit 341 may detect an abnormality candidate that may have occurred around the vehicle 2 or in the vehicle 2 itself by inputting the combination, into a classifier pre-trained to determine the content of the abnormality that is assumed on the combination. Such a classifier may be, for example, a multi-layer perceptron-type neural network or a support vector machine.

For a vehicle 2 at which the abnormality candidate has been detected among the vehicles 2, the abnormality detection unit 341 outputs, to any of the monitoring terminals 35, the detected abnormality candidate, the identification information of the vehicle 2, the outside-vehicle image or the inside-vehicle image acquired at the vehicle 2, the vehicle state information, the current position of the vehicle 2, and information indicating traffic status and a road structure at the current position, via the communication interface 31. Then, the monitoring operator performs an operation indicating that the fact that the abnormality corresponding to the detected candidate has actually occurred is checked via the monitoring terminal 35, and the server 3 receives an operation signal in response to the operation via the communication interface 31. Then, the abnormality detection unit 341 determines that the abnormality corresponding to the candidate has been detected. Thereafter, the abnormality detection unit 341 notifies the travel instruction determination unit 342 and the priority setting unit 344 of the content of the detected abnormality, the identification information of the vehicle 2 associated with the detected abnormality, the outside-vehicle image or inside-vehicle image acquired at the vehicle 2, the vehicle state information, the current position of the vehicle 2, and the information indicating the traffic status and the road structure at the current position of the vehicle 2. On the other hand, the monitoring operator performs an operation indicating that the fact that the abnormality corresponding to the detected candidate does not occur is checked via the monitoring terminal 35, and the server 3 receives an operation signal in response to the operation via the communication interface 31. Then, the abnormality detection unit 341 determines that the abnormality corresponding to the detected candidate does not occur.

The travel instruction determination unit 342 determines a travel instruction, according to the content of the detected abnormality, to the vehicle at which an abnormality is detected by the abnormality detection unit 341 or the vehicle that has notified of the abnormality among the vehicles 2. For example, the travel instruction determination unit 342 determines the travel instruction according to the content of the abnormality by referring to the reference table showing the correspondence between the content of the abnormality and the content of the travel instruction. Such a reference table is stored in advance in, for example, the storage device 32.

Figure 6:
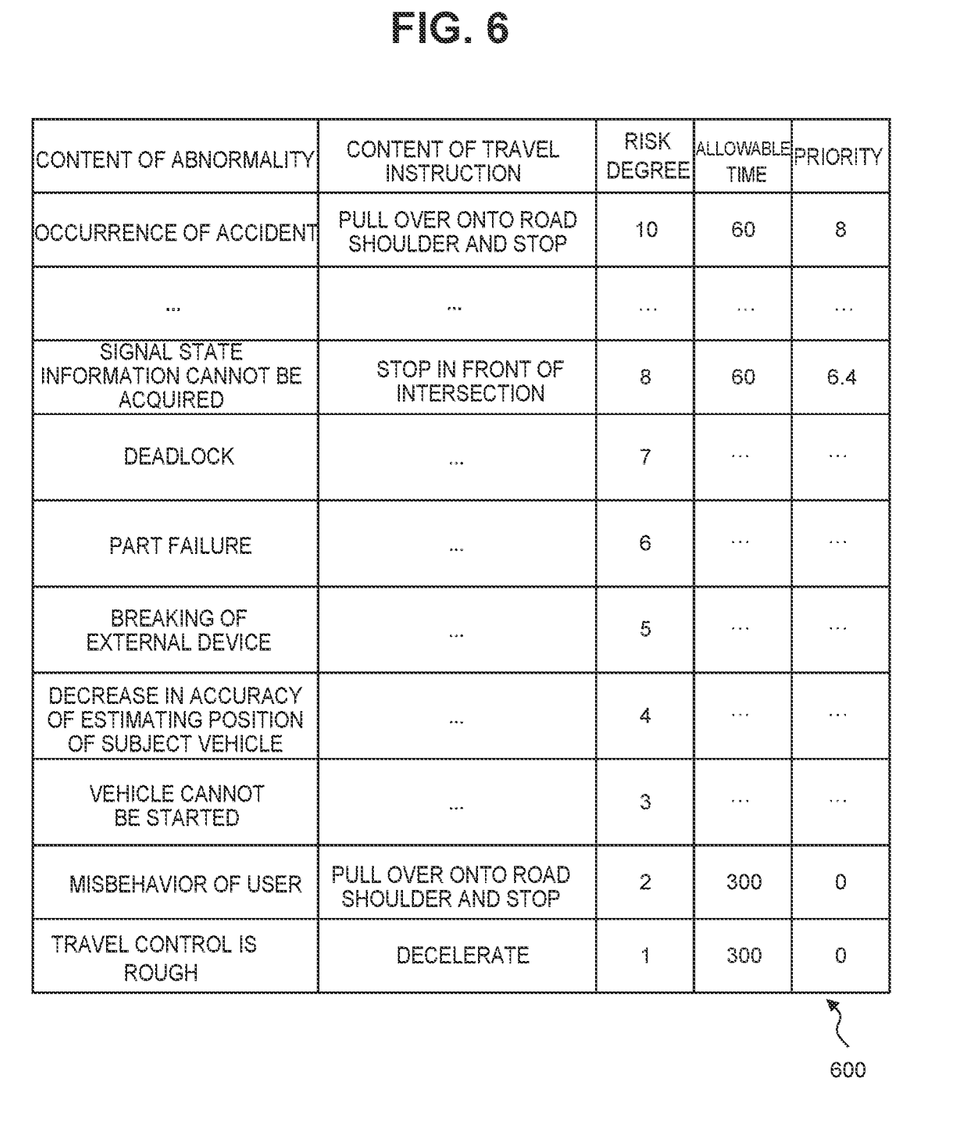
FIG. 6 is one example of a reference table showing a correspondence between the content of an abnormality and the content of a travel instruction.

FIG. 6 is an example of a reference table showing the correspondence between the content of the abnormality and the content of the travel instruction. Each cell of the leftmost column of the reference table 600 shows the content of a sensed abnormality. Further, each cell of the second column from the left of the reference table 600 shows the content of the travel instruction corresponding to the abnormality. For example, when the occurrence of an accident (including an accident occurring around the vehicle 2 as well as an accident associated with the vehicle 2 itself) is shown as the content of the abnormality, an instruction to pull over the vehicle 2 onto the road shoulder and stop the vehicle 2 is selected as a corresponding travel instruction. Moreover, additional instructions to the vehicle 2 may include an instruction to open the door or an instruction to notify the user to exit from the vehicle 2. In addition, when it is shown that signal state information cannot be acquired as the content of the abnormality, an instruction to stop the vehicle 2 in front of an intersection where the traffic signal is installed is selected as a corresponding travel instruction. Furthermore, when a misbehavior of the user on board is shown as the content of the abnormality, an instruction to pull over the vehicle 2 onto the road shoulder and stop the vehicle 2 is selected as a corresponding travel instruction. Moreover, additional instructions to the vehicle 2 may include an instruction to record the inside-vehicle image for a certain period or an instruction to output a warning sound via a speaker provided in the vehicle. Furthermore, when it is shown that the traveling control is rough as the content of the abnormality, an instruction to decelerate by a designated speed is selected as a corresponding travel instruction.

The travel instruction determination unit 342 determines the content of the travel instruction corresponding to the content of the abnormality, and notifies the travel instruction unit 343 and the notification unit 345 of the content of the determined travel instruction, together with the identification information of the corresponding vehicle.

The travel instruction unit 343 prepares a travel instruction of the content notified from the travel instruction determination unit 342. Then, the travel instruction unit 343 transmits the prepared travel instruction to the vehicle specified by the identification information notified from the travel instruction determination unit 342, among the vehicles 2, via the communication interface 31, the communication network 4, and the wireless base station 5.

The priority setting unit 344 determines, according to at least the content of the sensed abnormality, the priority for defining the order of notifying the instruction operator of the content of the travel instruction, and the like, to the vehicle at which the abnormality has been detected by the abnormality detection unit 341 or the vehicle that has notified of the abnormality, among the vehicles 2. In the present embodiment, the priority setting unit 344 determines the priority based on the risk degree of the abnormality and the allowable time according to the content of the sensed abnormality. For example, the priority setting unit 344 sets the priority higher as the risk degree is higher or the allowable time is shorter.

The priority setting unit 344 can determine the risk degree and the allowable time according to the content of the sensed abnormality by referring to, for example, the reference table showing the correspondence between the content of the sensed abnormality, and the risk degree and the allowable time.

Returning to FIG. 6, as shown in the third column from the left of the reference table 600, the risk degree is represented by, for example, a scale of 1 to 10. In the present embodiment, the risk degree is set to a higher value as the safety for the user aboard the vehicle and the people around the vehicle is lower. For example, when the occurrence of an accident is shown as the content of the abnormality, the risk degree is 10, which is the highest. In addition, when it is shown that the signal state information cannot be acquired as the content of the abnormality, the risk degree is 8. Furthermore, when the misbehavior of the user on board is shown as the content of the abnormality, the risk degree is 2 because the influence on the safety of the traveling of the vehicle is low. Furthermore, when it is shown that the traveling control is rough as the content of the abnormality, the risk degree is 1 because the traveling of the vehicle itself is safely controlled.

In addition, the allowable time is also set according to the content of the sensed abnormality. In the present embodiment, the allowable time is set to a longer time as the abnormality has less influence on the safety of the user aboard the vehicle and the people around the vehicle. For example, when the occurrence of an accident is shown or when it is shown that the signal state information cannot be acquired as the content of the abnormality, the allowable time is set to 60 seconds. Moreover, when the misbehavior of the user on board or the rough travel control is shown as the content of the abnormality, the allowable time is set to 300 seconds.

According to a modified embodiment, the allowable time may be set according to the state of the vehicle when the abnormality is sensed as well as according to the content of the sensed abnormality. Here, the allowable time may be set longer as the state of the vehicle is higher in safety for the user aboard the vehicle and the people around the vehicle. For example, even when the content of the sensed abnormality is that the signal state information cannot be acquired, the allowable time when the vehicle is already stopped may be set longer than the allowable time when the vehicle is traveling, for example, to 180 seconds. Similarly, the risk degree may also be set according to the state of the vehicle when an abnormality is sensed. Here, the risk degree may be set to a lower degree as the state of the vehicle is higher in safety for the user aboard the vehicle and the people around the vehicle.

The priority setting unit 344 calculates the priority by, for example, multiplying the risk degree by a value $(t_{max}-t)/t_{max}$ obtained by dividing the difference $(t_{max}-t)$ between the maximum value $t_{max}$ of the settable allowable time and the set allowable time t by the maximum value $t_{max}$. For example, when the maximum value $t_{max}$ of the allowable time is 300 seconds, the priority in which the content of the abnormality is the occurrence of an accident is 10×(300−60)/300=8. As such, the priority setting unit 344 can set the priority to be higher as the risk degree is higher or as the allowable time is shorter. In addition, the priority setting unit 344 may determine the priority according to another formulation in which the priority is higher as the risk degree is higher or as the allowable time is shorter.

The priority setting unit 344 notifies the notification unit 345 of the priority of the vehicle at which the abnormality is detected by the abnormality detection unit 341 or the vehicle that has notified of the abnormality among the vehicles 2, together with the content of the travel instruction determined by the travel instruction determination unit 342, the identification information of the vehicle, the outside-vehicle image or the inside-vehicle image acquired at the vehicle, the vehicle state information, the current position of the vehicle, and traffic status on the current position, and information indicating traffic status and a road structure at the current position.

For the vehicle 2 at which the abnormality has been detected by the abnormality detection unit 341 or the vehicle that has notified of the abnormality among the vehicles 2, the notification unit 345 notifies any one of the instruction terminals 36 of the content of the travel instruction determined by the travel instruction determination unit 342, the identification information of the vehicle 2, the outside-vehicle image or the inside-vehicle image acquired at the vehicle 2, the vehicle state information, the current position of the vehicle 2, and the information indicating the traffic status and the road structure at the current position, via the communication interface 31. Here, when an abnormality is simultaneously sensed at a plurality of vehicles 2, the notification unit 345 notifies any one of the instruction terminals 36 of the content of the travel instruction and the like in the order from the vehicle with the highest priority. Here, the notification unit 345 may notify the content of the travel instruction and the like to each instruction terminal 36 in the order from the instruction terminal having the smallest number of the difference (that is, the number of unchecked travel instructions) between the number of the content of the travel instruction that has been already notified and the number of checking operations performed by the instruction operator for the notified travel instructions. As such, the abnormality with higher priority is notified to the instruction terminal 36 operated by the stand-by instruction operator, such that the instruction operator can respond to the abnormality in a short time.

The instruction operator performs an operation indicating that the content of the travel instruction transmitted to the vehicle 2 associated with the abnormality is confirmed via the instruction terminal 36, and the server 3 receives the operation signal in response to the operation via the communication interface 31. Then, the notification unit 345 stores the content of the latest travel instruction transmitted to the vehicle 2 in the storage device 32 in association with the identification information of the vehicle 2. In case the instruction operator does not perform any operation even when the set allowable time has elapsed after the content of the travel instruction is displayed on the display device of the instruction terminal 36, the instruction terminal 36 may transmit, to the server 3, an operation signal indicating that the content of the travel instruction, and the like, has been confirmed.

In addition, the instruction operator performs an operation indicating that a modified or an additional travel instruction different from the content of the travel instruction transmitted to the vehicle 2 associated with the abnormality is transmitted via the instruction terminal 36, and the server 3 receives an operation signal in response to the operation via the communication interface 31. Then, the notification unit 345 causes the travel instruction unit 343 to prepare a modified or an additional travel instruction in response to the operation signal. Then, the notification unit 345 transmits the modified or the added travel instruction to the vehicle 2 associated with the abnormality via the communication interface 31, the communication network 4, and the wireless base station 5.

Figure 7:
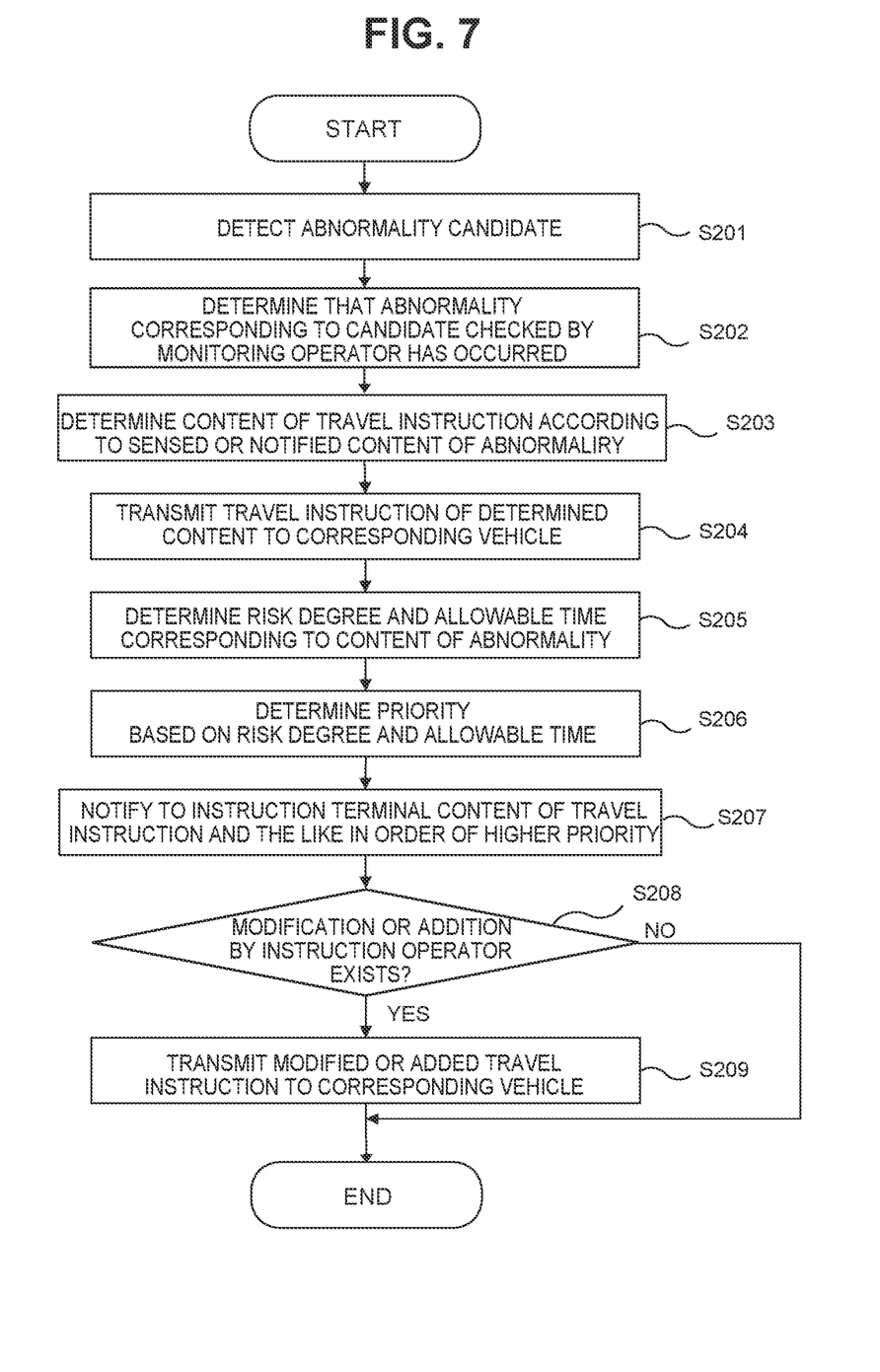
FIG. 7 is a flowchart of an operation of the vehicle control processing.

FIG. 7 is an operation flowchart of the vehicle control processing. The processor 34 of the server 3 performs the vehicle control processing, for example, at predetermined intervals according to the operation flowchart described below.

The abnormality detection unit 341 of the processor 34 detects the candidate of an abnormality that may have occurred around the vehicle 2 or in the vehicle 2 itself, based on vehicle state information on the vehicle 2, information on the surroundings of the vehicle 2, or the like, for each vehicle 2 (step S201). Then, among the vehicles 2 at which the abnormality candidate has been detected, the abnormality detection unit 341 determines that the abnormality corresponding to the detected candidate has occurred, for a vehicle in which the monitoring operator has checked the fact that the abnormality has actually occurred via the monitoring terminal 35 (step S202).

The travel instruction determination unit 342 of the processor 34 determines the content of the travel instruction according to the content of the detected abnormality for the vehicle at which the abnormality is detected by the abnormality detection unit 341 or the vehicle that has notified of the abnormality, among the vehicles 2 (step S203). Then, the travel instruction unit 343 of the processor 34 prepares the travel instruction of the determined content, and transmits the prepared travel instruction to the corresponding vehicle (step S204).

Further, the priority setting unit 344 of the processor 34 determines the risk degree and the allowable time for the vehicle at which the abnormality is detected by the abnormality detection unit 341 or the vehicle that has notified of the abnormality among the vehicles 2 according to the content of the abnormality (step S205). Then, the priority setting unit 344 determines the priority based on the risk degree and the allowable time (step S206).

For the vehicle at which the abnormality has been detected by the abnormality detection unit 341 or the vehicle that has notified of the abnormality, among the vehicles 2, the notification unit 345 of the processor 34 notifies any of the instruction terminals 36 of the content of the travel instruction, and the like, in the order from the vehicle 2 with the highest priority, via the communication interface 31 (step S207). Then, the notification unit 345 determines whether the travel instruction has been modified or added by the instruction operator via the instruction terminal 36 (step S208). When the travel instruction has been modified or added (Yes in step S208), the travel instruction unit 343 prepares the modified or added travel instruction, and transmits the prepared travel instruction to the corresponding vehicle (step S209). After step S209, or when the travel instruction transmitted is confirmed by the instruction operator at step S208 (No in step S208), the processor 34 ends the vehicle control processing.

As described above, when an abnormality occurs around the one or more autonomous driving vehicles or in the autonomous driving vehicles themselves, the vehicle control device prepares a travel instruction according to the abnormality, and transmits the prepared travel instruction to the autonomous driving vehicles associated with the abnormality. As such, the vehicle control device can remotely control the autonomous driving vehicle associated with the abnormality. In addition, the vehicle control device sets the priority based on the risk degree and the allowable time according to the abnormality that has occurred, and notifies the instruction operator of the content of the travel instruction transmitted to the autonomous driving vehicle in the order from the vehicle associated with the abnormality having the highest priority. When the instruction operator checks the content of the travel instruction and determines that it is better to modify the content of the travel instruction, the vehicle control device prepares the travel instruction modified in response to the operation by the operator, and transmits the modified vehicle instruction to the autonomous driving vehicle via the communication network. As such, the vehicle control device can appropriately control the autonomous driving vehicle even when any abnormality occurs around the autonomous driving vehicle or in the autonomous driving vehicle itself.

Moreover, according to a modified embodiment, the notification unit 345 may notify any of the instruction terminals 36 of the content of the travel instruction before the travel instruction prepared by the travel instruction unit 343 is transmitted to the vehicle 2 associated with the abnormality that has occurred. Then, after the instruction operator checks or modifies the content of the travel instruction via the instruction terminal 36, the travel instruction unit 343 transmits the checked or modified travel instruction to the vehicle 2 associated with the abnormality that has occurred. Alternatively, the processor 34 may determine whether the notification unit 345 notifies the content of the travel instruction to any one of the instruction terminals 36 after or before the travel instruction unit 343 transmits the travel instruction to the vehicle 2 associated with the abnormality that has occurred, according to the content of the abnormality that has occurred. For example, when the content of the abnormality does not affect the safety of the user on board and the people around the vehicle 2 even if the vehicle 2 does not receive the travel instruction (for example, when the risk degree according to the content of the abnormality is equal to or less than the predetermined threshold, and specifically, when the content of the abnormality is a misbehavior of the occupant), the notification unit 345 notifies the content of the travel instruction to any of the instruction terminals 36, the instruction operator checks or modifies the travel instruction, and then the travel instruction unit 343 transmits the checked or modified travel instruction to the vehicle 2 associated with the abnormality that has occurred. Conversely, when the content of the abnormality may affect the safety of the user on board and the people around the vehicle 2 if the vehicle 2 continues to travel autonomously (for example, when the risk degree according to the content of the abnormality is higher than the predetermined threshold, and specifically, when the content of the abnormality is the occurrence of an accident), the travel instruction unit 343 transmits the travel instruction and then the notification unit 345 notifies any of the instruction terminals 36 of the content of the transmitted travel instruction for checking, in the same manner as in the above embodiment.

According to another modified embodiment, the priority setting unit 344 may set the priority directly based on the content of the notified or sensed abnormality. In this case, for example, the reference table showing the correspondence between the content of the abnormality and the priority is stored in advance in the storage device 32. Then, the priority setting unit 344 sets the priority corresponding to the content of the notified or sensed abnormality by referring to the reference table. Alternatively, the priority setting unit 344 may set the priority based on one of the risk degree and the allowable time corresponding to the content of the notified or sensed abnormality. In this case, for example, the priority setting unit 344 may set the risk degree itself as the priority, or may set the reciprocal of the allowable time as the priority.

Further, according to yet another modified embodiment, for each of specific abnormality candidates or specific situations of the vehicle 2 (for example, a situation where the vehicle turns right or the traffic signal at the intersection ahead of the vehicle 2 is in a predetermined lighting state), a monitoring terminal 35 may be provided. In this case, the abnormality detection unit 341 notifies the detected abnormality candidate to the monitoring terminal 35 corresponding to the detected abnormality candidate or the situation of the vehicle 2 among the plurality of monitoring terminals 35. In addition, the abnormality detection unit 341 determines whether the vehicle 2 is in a specific situation by, for example, determining whether the current position of the vehicle 2 corresponds to a specific situation, such as a right turn point on the travel route, indicated in the map information, or, for example, determining whether the lighting state of the traffic signal indicated by the signal state information notified from the vehicle 2 corresponds to a specific situation. As such, the monitoring operator checks whether the notified abnormality candidate has actually occurred, paying attention to the specific abnormality candidate or the specific situation. Therefore, the accuracy of detection for an abnormality is further improved.

Similarly, the instruction terminal 36 may be provided for each piece of specific content of an abnormality or specific situations of the vehicle 2. Then, the notification unit 345 notifies the travel instruction, or the like, to the instruction terminal 36 corresponding to the content of the abnormality or the situation of the vehicle 2 among the plurality of instruction terminals 36.

According to still another modified embodiment, the abnormality detection unit 341 may determine that the detected abnormality candidate itself is the abnormality that has occurred. In this case, the monitoring terminal 35 may be omitted.

According to even still another modified embodiment, the travel instruction determination unit 342 and the travel instruction unit 343 may prepare a travel instruction to another vehicle located around the vehicle 2, instead of the vehicle 2 itself from which the abnormality has been sensed or notified, and transmit the prepared travel instruction to another vehicle via the communication network 4 and the wireless base station 5. For example, when the content of the abnormality is that the vehicle cannot be started, another vehicle parked within a predetermined range (for example, 5 m or less) from the vehicle 2 associated with the abnormality is specified by referring to the current position of the vehicle 2 associated with the abnormality and the current positions of other vehicles. Then, the travel instruction determination unit 342 and the travel instruction unit 343 transmit a travel instruction to travel by the designated distance to the specified another vehicle.

A computer program that causes a computer to perform the vehicle control processing executed by the processor 34 of the server 3 may be recorded in, for example, a recording medium, such as an optical recording medium or a magnetic recording medium and thus distributed.

As described above, those skilled in the art can make various modifications to the embodiment to be implemented within the scope of the present disclosure.

What is claimed is:

1. An autonomous driving vehicle comprising:
   a wireless terminal communicatively coupled to an electronic control unit, the electronic control unit configured to:
   receive, with the wireless terminal, a travel instruction transmitted to the autonomous driving vehicle when an abnormality occurs in or around the autonomous driving vehicle, wherein:
   the travel instruction is generated in accordance with a priority calculated by multiplying a risk degree by a value obtained by dividing a difference between a maximum value of a settable allowable time and an allowable time by the maximum value,
   the risk degree represents a degree of risk that is determined according to a content of the abnormality of the autonomous driving vehicle, and
   the allowable time is an allowable time for checking the travel instruction to the autonomous driving vehicle; and
   control traveling of the autonomous driving vehicle based on the travel instruction.

2. The autonomous driving vehicle of claim 1, further comprising one or more sensors for acquiring information indicating a state of the autonomous driving vehicle, wherein the electronic control unit is further configured to:
   determine the abnormality based on the acquired information indicating the state of the autonomous driving vehicle, and
   transmit, with the wireless terminal, the information indicating the state of the autonomous driving vehicle at a time when the abnormality occurs to a server.

3. The autonomous driving vehicle of claim 2, wherein the electronic control unit is further configured to:
   determine the content of the abnormality based on the acquired information indicating the state of the autonomous driving vehicle, and
   when a misbehavior of a user on board the autonomous driving vehicle is determined as the content of the abnormality, select and execute a travel instruction to pull over the autonomous driving vehicle onto a road shoulder and stop the autonomous driving vehicle.

4. The autonomous driving vehicle of claim 2, wherein the electronic control unit is further configured to:
   determine the content of the abnormality based on the acquired information indicating the state of the autonomous driving vehicle, and
   when signal state information of a traffic signal cannot be acquired is determined as the content of the abnormality, select and execute an instruction to stop the autonomous driving vehicle in front of an intersection where the traffic signal is installed.

5. The autonomous driving vehicle of claim 2, wherein the electronic control unit is further configured to:
   determine the content of the abnormality based on the acquired information indicating the state of the autonomous driving vehicle, and
   when traveling control is rough is determined as the content of the abnormality, select and execute an instruction to decelerate the autonomous driving vehicle by a predefined designated speed.

6. The autonomous driving vehicle of claim 2, wherein the electronic control unit is further configured to:
   determine the content of the abnormality based on the acquired information indicating the state of the autonomous driving vehicle, and
   when an occurrence of an accident is determined as the content of the abnormality, select and execute a travel instruction to pull over the autonomous driving vehicle onto a road shoulder and stop the autonomous driving vehicle.

7. The autonomous driving vehicle of claim 6, wherein when the occurrence of the accident is determined as the content of the abnormality, the electronic control unit is further configured to select and execute at least one of an instruction to open a door or an instruction to notify a user to exit from the autonomous driving vehicle.

8. A method of controlling an autonomous driving vehicle comprising:
   receiving, with a wireless terminal communicatively coupled to an electronic control unit of the autonomous driving vehicle, a travel instruction transmitted to the autonomous driving vehicle when an abnormality occurs in or around the autonomous driving vehicle, wherein:
   the travel instruction is generated in accordance with a priority calculated by multiplying a risk degree by a value obtained by dividing a difference between a maximum value of a settable allowable time and an allowable time by the maximum value,
   the risk degree represents a degree of risk that is determined according to a content of the abnormality of the autonomous driving vehicle, and the allowable time is an allowable time for checking the travel instruction to the autonomous driving vehicle; and controlling traveling of the autonomous driving vehicle based on the travel instruction.

9. The method of claim 8, further comprising
determining the abnormality based on acquired information from one or more sensors of the autonomous driving vehicle indicating the state of the autonomous driving vehicle, and
transmitting, with the wireless terminal, the information indicating the state of the autonomous driving vehicle at a time when the abnormality occurs to a server.

10. The method of claim 9, further comprising:
determining the content of the abnormality based on the acquired information indicating the state of the autonomous driving vehicle, and
when a misbehavior of a user on board the autonomous driving vehicle is determined as the content of the abnormality, selecting and executing a travel instruction to pull over the autonomous driving vehicle onto a road shoulder and stop the autonomous driving vehicle.

11. The method of claim 9, further comprising:
determining the content of the abnormality based on the acquired information indicating the state of the autonomous driving vehicle, and
when signal state information of a traffic signal cannot be acquired is determined as the content of the abnormality, selecting and executing an instruction to stop the autonomous driving vehicle in front of an intersection where the traffic signal is installed.

12. The method of claim 9, further comprising:
determining the content of the abnormality based on the acquired information indicating the state of the autonomous driving vehicle, and
when traveling control is rough is determined as the content of the abnormality, selecting and executing an instruction to decelerate the autonomous driving vehicle by a predefined designated speed.

13. The method of claim 9, further comprising:
determining the content of the abnormality based on the acquired information indicating the state of the autonomous driving vehicle, and
when an occurrence of an accident is determined as the content of the abnormality, selecting and executing a travel instruction to pull over the autonomous driving vehicle onto a road shoulder and stop the autonomous driving vehicle.

14. The method of claim 13, further comprising selecting and executing at least one of an instruction to open a door or an instruction to notify a user to exit from the autonomous driving vehicle, when the occurrence of the accident is determined as the content of the abnormality.

* * * * *